United States Patent [19]

Ueda

[11] Patent Number: 5,167,018
[45] Date of Patent: Nov. 24, 1992

[54] POLYGON-FILLING APPARATUS

[75] Inventor: Tomoaki Ueda, Kyoto, Japan

[73] Assignee: Daikin Industries, Ltd., Japan

[21] Appl. No.: 759,657

[22] Filed: Sep. 13, 1991

Related U.S. Application Data

[63] Continuation of Ser. No. 393,109, Aug. 4, 1989, abandoned, which is a continuation of Ser. No. 100,805, Sep. 24, 1987, abandoned.

[30] Foreign Application Priority Data

Sep. 24, 1986 [JP] Japan .................. 61-225141

[51] Int. Cl.$^5$ .......................................... G06F 15/34
[52] U.S. Cl. ............................... 395/162; 364/231.5; 364/231.8; 340/750
[58] Field of Search ............... 364/518, 520, 522, 723, 364/736, 231.5, 231.8, 948.34, 200 MS file, 900 MS file; 340/728, 750; 365/189.04; 395/162, 163, 164

[56] References Cited

U.S. PATENT DOCUMENTS

| | | | |
|---|---|---|---|
| 4,001,565 | 1/1977 | Kawai | 235/152 |
| 4,313,173 | 1/1982 | Candy et al. | 364/723 |
| 4,497,035 | 1/1985 | Yabuuchi | 364/577 |
| 4,587,637 | 5/1986 | Ishizuka | 365/189 |
| 4,626,838 | 12/1986 | Tsujioka et al. | 340/744 |
| 4,747,154 | 5/1988 | Suzuki et al. | 382/47 |
| 4,823,258 | 4/1989 | Yamazaki | 364/200 |
| 4,825,361 | 4/1989 | Omoda et al. | 364/200 |
| 4,839,845 | 6/1989 | Rusterholz et al. | 364/736 |

FOREIGN PATENT DOCUMENTS 0064864  4/1982  Japan .................. 364/723

Primary Examiner—Gary V. Harkcom
Assistant Examiner—Phu K. Nguyen
Attorney, Agent, or Firm—Beveridge, DeGrandi & Weilacher

[57] ABSTRACT

Polygon filling apparatus in which data are obtained through registers from memory files for holding accumulated addition values and incremental values, such data are added in a single addition circuit, the accumulated addition values in one of said registers are supplied to a linear drawing unit and the addition results are loaded in the memory loading files for accumulated addition values through a register, a series of the operations above-mentioned being carried out in a pipe-line manner at a high speed.

5 Claims, 5 Drawing Sheets

POLYGON-FILLING APPARATUS

This application is a continuation of application Ser. No. 07/393,109 filed Aug. 4, 1989, now abandoned, which is a continuation of application Ser. No. 07/100,805, filed Sep. 24, 1987, abandoned.

BACKGROUND OF THE INVENTION

The present invention relates to a polygon-filling apparatus, and more particularly to a polygon-filling apparatus having a linear interpolation unit for linearly interpolating two sides of a polygon selected based on coordinates data supplied from a host computer, and a linear drawing unit for generating linear drawing data based on the linear-interpolation data.

Usually, a graphic display apparatus indispensably requires a polygon-filling function, and therefore incorporates a polygon-filling apparatus which, as shown in FIG. 5, has linear interpolation units each including a plurality of division circuits and addition circuits, and a linear drawing unit for linearly drawing data obtained by the linear interpolation units.

More specifically, each of the linear interpolation units includes total eight division circuits for interpolation of two sides in x-, y-, z- and I-directions, respectively, and eight addition circuits to which output data from the division circuits are entered, respectively, such that linear interpolation of both sides in x-, y-, z- and I-directions are achieved simultaneously.

The linear drawing unit includes three division circuits to which data obtained by each of the linear interpolation units are entered, and addition circuits to which output data from the division circuits are entered, respectively. The linear drawing unit is adapted to generate a number of pixel data corresponding to a line segment to be drawn based on interpolation data of each side obtained by each of the linear interpolation units, and such pixel data are supplied to a drawing memory.

Accordingly, the linear interpolation operation for two sides can be carried out at a high speed, after which there can be generated a number of pixel data corresponding to line segments to be drawn based on the interpolation data.

To achieve a texture mapping function, there can be added linear interpolation units and a linear drawing unit for a texture plane. To achieve a sectioning function, there can be added a section boundary value interpolation unit for each of the linear interpolation units.

In the polygon-filling apparatus having the arrangement above-mentioned, the linear interpolation units are formed by a number of division circuits and addition circuits, thus presenting the problem that the arrangement is complicated. Further, the frequency in use of such complicated linear interpolation units is considerably less than that of the linear drawing units.

More specifically, it is now supposed that one polygon is, for example, a regular square having 20×20 picture elements. To process one polygon, in the linear interpolation units average 25 additions and 1 to 2 divisions are required, whereas in the linear drawing unit, 400 additions and average 25 divisions are required. Thus, the frequency in use of the linear interpolation units is considerably less than that of the linear drawing unit. In spite of such decreased frequency in use, the linear interpolation units require a number of division circuits and a number of addition circuits. This presents a problem of very low working efficiency of the division circuits and the addition circuits.

In the linear interpolation units, an addition operation is carried out in the addition circuits based on data supplied from the division circuits, after which interpolation data thus obtained are transmitted to the linear drawing unit. These addition operation and interpolation data transmission operation are successively carried out serially, as shown in FIG. 6. More specifically, one operation cycle of the addition circuits in the linear interpolation units is complete when, after the adding operation of every addition circuit has been carried out (See Time T0), interpolation data of x, y, z and I for two sides are successively transmitted (See Time T1 to T8), and division start instruction data for the linear drawing unit are finally transmitted (See Time T9).

Accordingly, when the total time for the addition operation and the addition result transmission operation is set, for example, to 1 $\mu$sec., the time for the addition operation is 50 nsec., while the time for the addition result transmission operation is 100 nsec., so that the addition circuits are not operated at all in the remaining time of 850 nsec. That is, even though interpolation data of x, y, z and I for two sides have been obtained substantially at the same time, the addition circuits are not operated at all in a relatively long period of time, as above-mentioned. Therefore, the processing time cannot be shortened so much as a whole. Accordingly, even though a number of addition circuits are used such that all interpolation data are obtained substantially at the same time, this merely makes the arrangement complicated with considerable improvements in processing speed.

It is also considered to concurrently transmit interpolation data obtained. This creates the problem that the number of parts to be mounted is considerably increased. Further, even though provision is made so as to achieve a concurrent transmission, another problem is created. That is, a division number obtained based on the starting and terminal points of x- and y-coordinates, is used for a denominator in the division circuit, and this division number is used for obtaining linear drawing data of z- and I-coordinates. Accordingly, a changeover gate is required to supply division number data and interpolation data from the linear interpolation units. Therefore, even though provision is made such that all interpolation data are transmitted concurrently, the processing time cannot be shortened so much and the problem of considerable increase in the number of mounted parts is rather prominent.

This problem is particularly apparent when a texture mapping processing or a sectioning processing is carried out in addition to the polygon-filling operation.

SUMMARY OF THE INVENTION

It is an object of the present invention to provide a polygon-filling apparatus having a considerably simplified arrangement.

It is another object of the invention to provide a polygon-filling apparatus capable of remarkably holding down the increase in time required for linear interpolation necessary for filling a polygon.

In order to achieve the objects above-mentioned, the polygon-filling apparatus in accordance with the present invention has a linear interpolation unit for linearly interpolating two sides of a polygon selected based on coordinates data supplied from a host computer, which linear interpolation unit comprises:

first memory means for memorizing initial values or accumulated addition values;

second memory means for memorizing incremental values;

first and second registers for temporarily holding the contents of the first and second memory means, respectively;

addition means for adding the contents of the first and second registers to each other; and a third register for temporarily holding addition results supplied from the addition means, and in which the contents of the first register are supplied to a linear drawing unit.

In accordance with the polygon-filling apparatus having an arrangement above-mentioned, when a polygon is to be filled by linearly interpolating two sides of the polygon selected based on coordinates data supplied from a host computer and by generating linear drawing data based on data obtained by such linear interpolation, the following operations are carried out. That is, initially an initial value of the first linear interpolation data is loaded in the first memory means, and an incremental value of the first linear interpolation data is loaded in the second memory means. Afterwards, the contents of the first and second memory means are temporarily loaded in the first and second registers, and the contents of the first register are supplied to the linear drawing unit. Further, the contents of the first and second registers are added to each other by the addition means, and the addition result is temporarily loaded in the third register. Based on the contents of the third register, the contents of the first memory means are renewed. While a series of the operations above-mentioned are being carried out, the first and second memory means need not to hold data any more after the data have been supplied from the first and second memory means to the first and second registers. Accordingly, an initial value and an incremental value of the second linear interpolation data can be loaded in the first and second memory means.

After the data obtained by the addition means have been supplied to the third register, the next addition operation can be carried out in the addition means. Accordingly, the addition means can carry out an addition operation based on the initial value and the incremental value of the second linear interpolation data. During such addition operation, an initial value and an incremental value of the third linear interpolation data are loaded in the first and second memory means, and then supplied to the first and second registers, respectively. Afterwards, the result of the addition operation can be loaded. Here, it is noted that the supply of the initial value and the incremental value to the first and second memory means is carried out for every apex of a polygon, whereas the reading of data supplied to the first and second registers is carried out for every operation cycle and the supply of the cumulative addition value to the first memory means is carried out for every operation cycle.

More specifically, such processings of linear interpolation data on the respective orders as reading, addition, data output and writing of addition result, can be successively carried out with one step delayed for each order.

As apparent from the foregoing, according to the present invention, linear interpolation can be achieved in a single addition circuit. This makes the arrangement of the present invention simplified. Further, the processing can be easily extended up to the number of dimensions determined by the capacities of the first and second memory means. Yet, the linear interpolation can be achieved at a speed on the order of the processing speed in the conventional method.

DETAILED DESCRIPTION OF THE PREFERRED EMBODIMENTS

Figure 1:
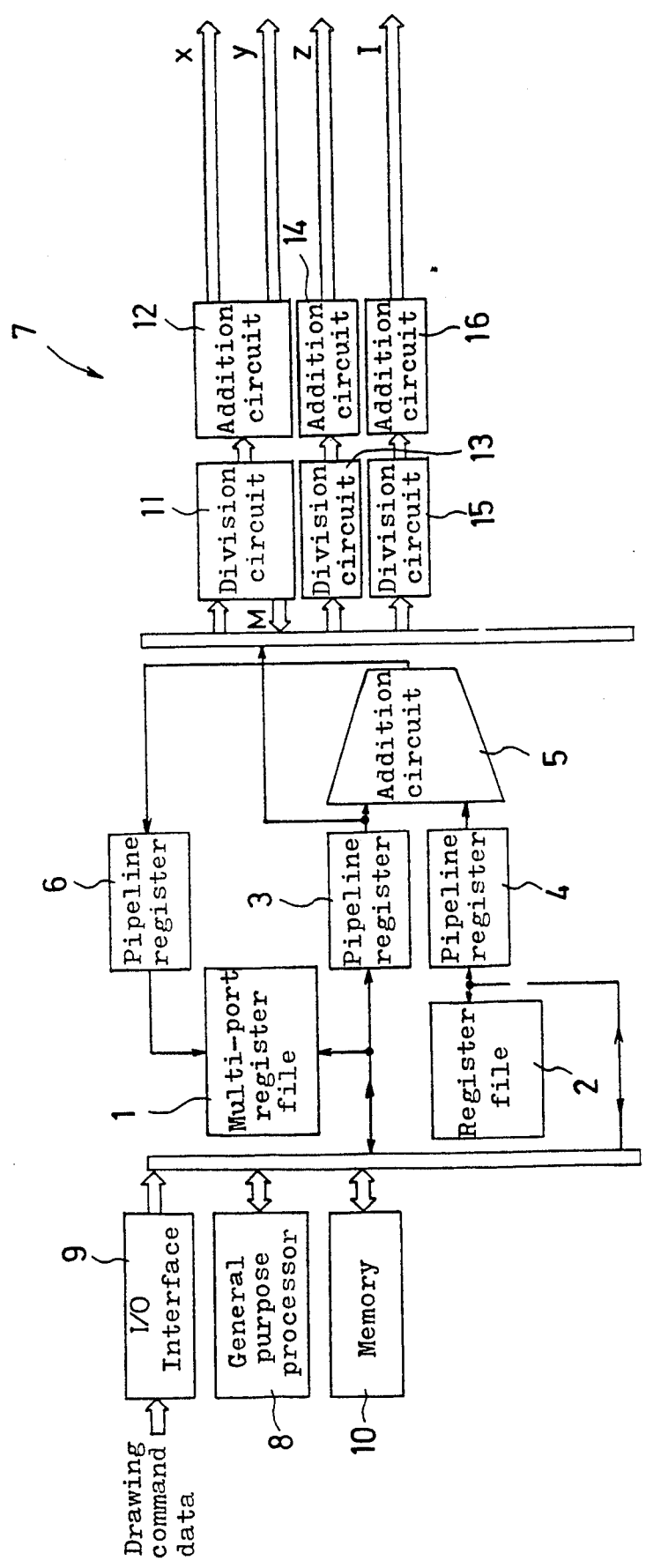
FIG. 1 is a block diagram of a polygon-filling apparatus in accordance with a first embodiment of the present invention.

FIG. 1 is a block diagram illustrating a first embodiment of the polygon-filling apparatus in accordance with the present invention.

A linear interpolation unit in the apparatus comprises a multi-port register file 1 for memorizing initial values or accumulated addition values, a register file 2 for memorizing incremental values, a first pipe line register 3 for temporarily holding the contents of the multiport register file 1, a second pipe line register 4 for temporarily holding the contents of the register file 2, an addition circuit 5 for adding the contents of the first and second pipe line registers 3 and 4 to each other, and a third pipe line register 6 for temporarily holding addition results. The contents of the third pipe line register 6 are supplied to the multi-port register file 1 and the contents of the first pipe line register 3 are supplied to a linear drawing unit 7. A general purpose processor 8 supplies, to the multi-port register file 1 and the register file 2, coordinates data or the like (coordinates data of the terminal points of sides of a polygon subjected to linear interpolation, and incremental data calculated based on the lengths of the sides).

An I/O interface 9 is disposed for fetching drawing command data or the like. A memory is generally designated by a reference numeral 10. The linear drawing unit 7 for generating, based on linear-interpolation data, pixel data which constitute line segments, comprises a division circuit 11 and an addition circuit 12 for x- and y-data, a division circuit 13 and an addition circuit 14 for z-data, and a division circuit 15 and an addition circuit 16 for I-data.

The following description will discuss the operation of the polygon-filling apparatus arranged as above-mentioned.

Polygon filling command data are supplied to the general purpose processor 8 through the I/O interface 9, and division is carried out based on the coordinates of the terminal points of the sides constituting a polygon to obtain incremental data. Afterwards, (1) For every apex, the coordinates data of the terminal points are loaded in the multi-port register file, while the incremental data are loaded in the register file 2.

(2) The x-coordinates data in the multi-port register file 1 are supplied to the first pipe line register 3, and the incremental data in the register file 2 are supplied to the second pipe line register 4. Further, the contents of the first pipe line register 3 are supplied to the linear drawing unit.

(3) Then, the coordinates data and the incremental data are provided as addends to the addition circuit 5 from the pipe line registers 3 and 4 and are added thereby.

(4) The addition result obtained by the addition circuit 5 is supplied to the third pipe line register 6.

(5) Finally, the contents of the third pipe line register 6 are loaded in the multi-port register file 1.

By a series of the operations above-mentioned, incremental data are successively added to the coordinates data of terminal points to achieve linear interpolation. It is however required to carry out the linear interpolation operations above-mentioned for the x-, y-, z- and I-coordinates of each side, so that a series of the operations above-mentioned need to be successively carried out for each of the coordinates.

In such case, when the processings (I) and (II) above-mentioned are complete for the x-coordinates, the pipe line registers 3 and 4 need not to hold the data relating to the x-coordinates. Accordingly, data relating to the y-coordinates can be loaded in the multi-port register file 1 and the register file 2, and the data thus loaded can be supplied to the pipe line registers 3 and 4.

When the processings (III) and (IV) for the x-coordinates are complete, the addition circuit 5 can carry out an addition operation based on the data relating to the y-coordinates loaded in the pipe line registers 3 and 4. When the addition circuit 5 is ready for such addition operation, data relating to the z-coordinates can be loaded in the multi-port register file 1 and the register file 2, and the data thus loaded can be supplied to the pipe line registers 3 and 4. Then, the operation (V) can be carried out.

Figure 2:
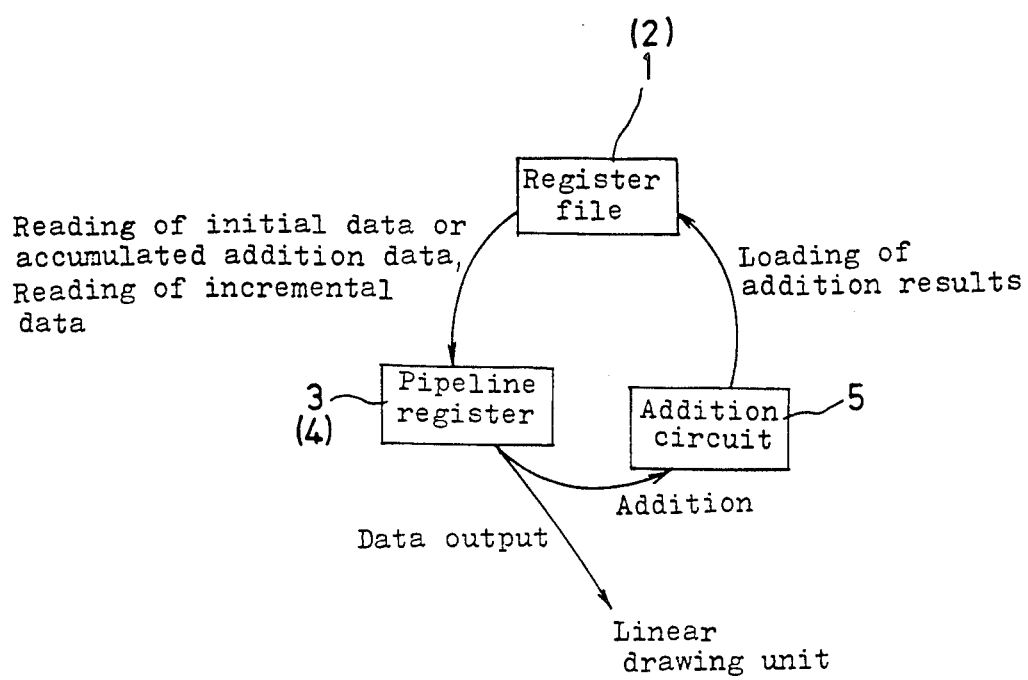
FIG. 2 and FIG. 3 are views schematically illustrating a linear, interpolation operation.
Figure 3:
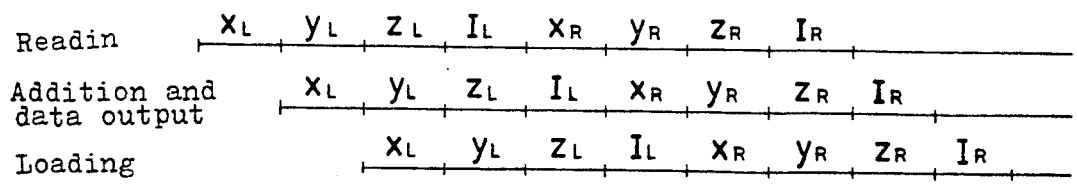

In summary, as shown in FIGS. 2 and 3, there are carried out, for respective coordinates data, a series of synchronous operations including reading of initial data or accumulated addition data from the multi-port register file 1, reading of incremental data from the register file 2, data output of the content of the first pipe line register 3 to the linear drawing unit, addition operation in the addition circuit 5 and loading of the addition result in the multi-port register file 1, such operations being carried out with one step delayed for each of the coordinates data. Accordingly, the present invention can achieve, as a whole, the linear interpolation and the transmission of interpolation data in a period of time substantially equal to that in the conventional method in which all data are obtained at the same time and afterwards the data thus obtained are successively transmitted to the linear drawing unit.

In the embodiment above-mentioned, the linear drawing unit 7 is adapted to carry out a division operation. This does not particularly cause the inconvenience of lengthened processing time, because the number of division operations to be carried out is very few when the linear interpolation is carried out.

Figure 4:
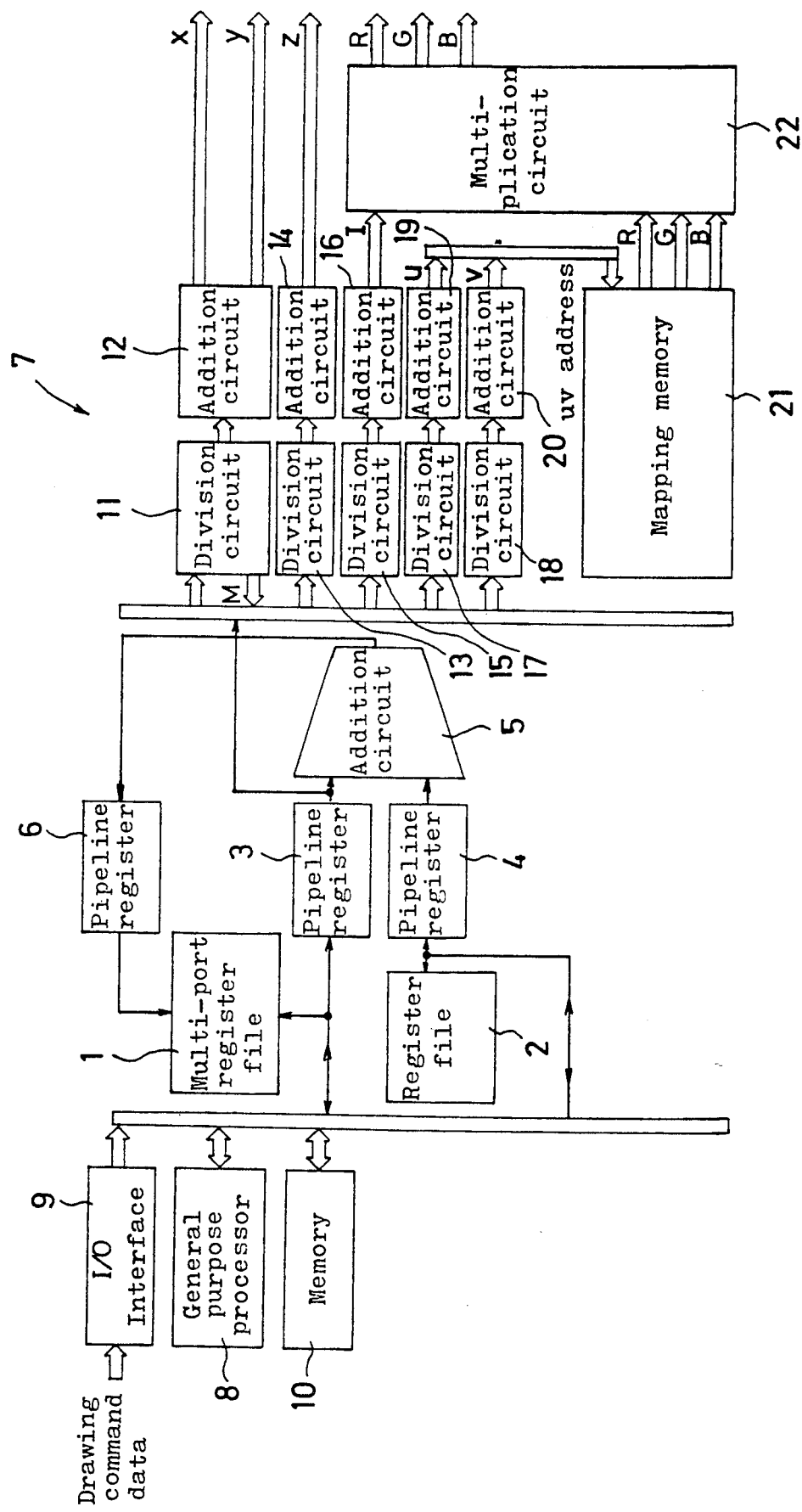
FIG. 4 is a block diagram of a polygon-filling apparatus in accordance with a second embodiment of the present invention.
Figure 5:
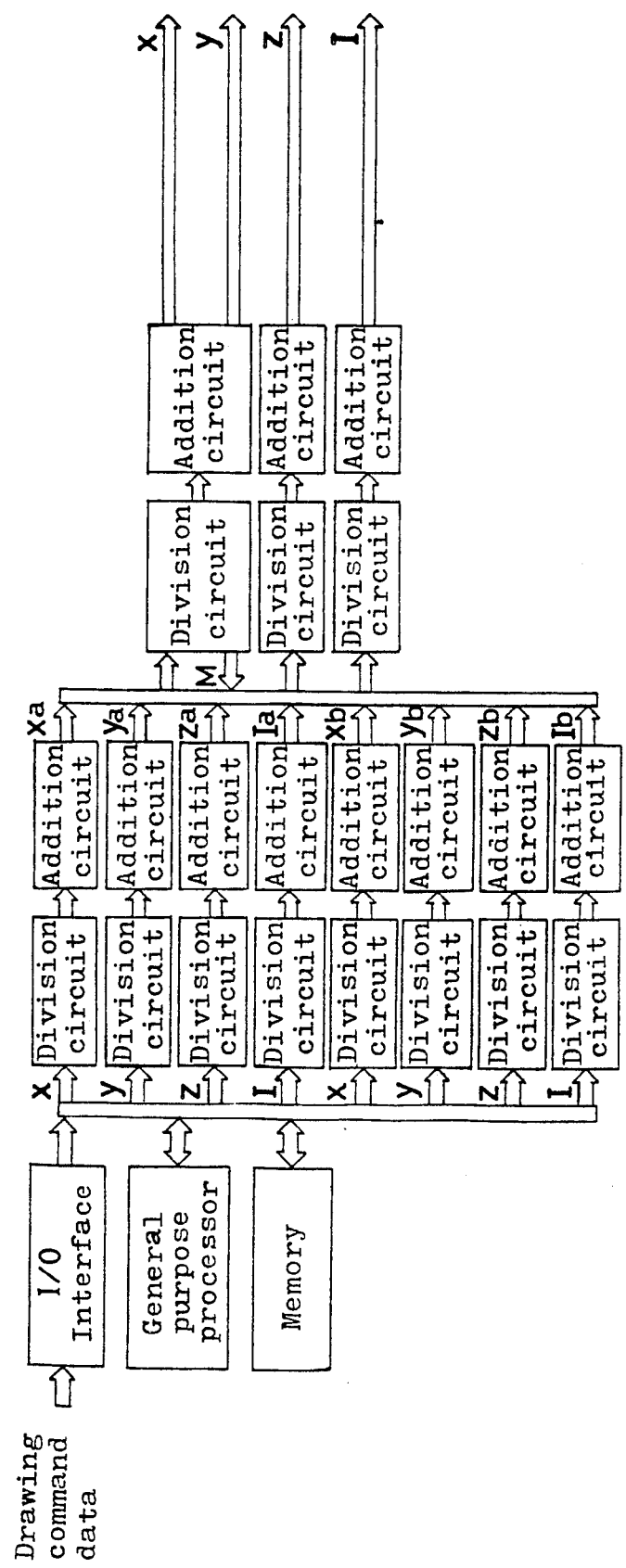
FIG. 5 is a block diagram of a conventional polygon-filling apparatus.
Figure 6:
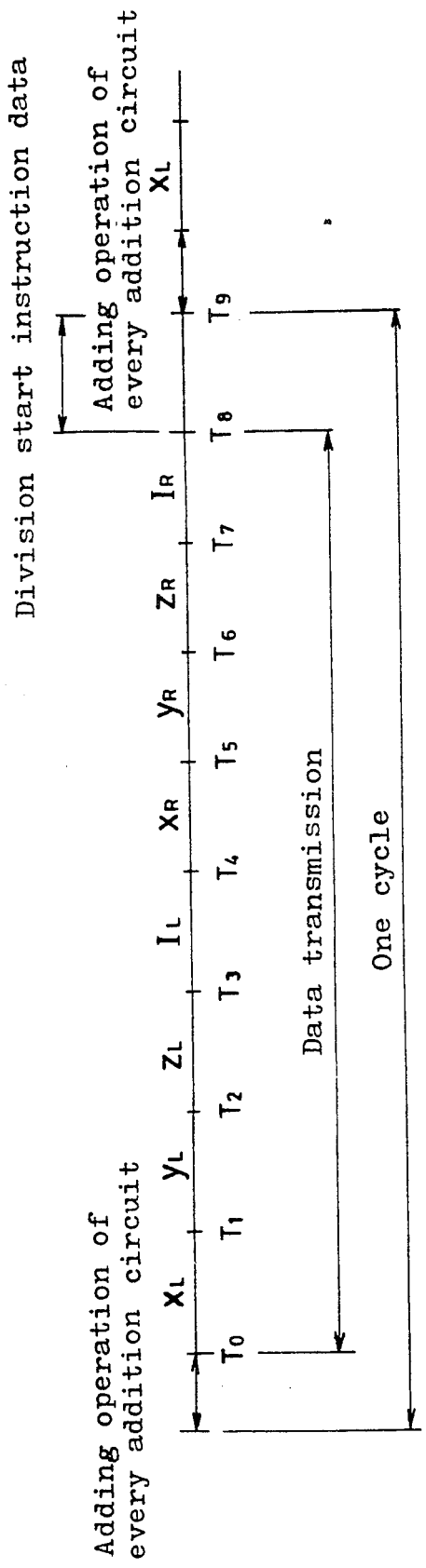
FIG. 6 is a view schematically illustrating a linear interpolation operation and a data transmission operation.

FIG. 4 is a block diagram of a second embodiment of the present invention which is identical with the first embodiment except for the following points only.

That is, to carry out a texture mapping operation, this second embodiment additionally includes division circuits 17 and 18 and addition circuits 19 and 20 for achieving linear drawing for a texture plane, a mapping memory 21 for memorizing addition results supplied from the addition circuits 19 and 20, and a multiplication circuit 22 for carrying out a shading processing or the like.

In this second embodiment, in addition to the x-, y-, z- and I-coordinates data, u- and v-coordinates data are also linearly interpolated successively in the linear interpolation unit to obtain linear-interpolation data. The data thus obtained are successively supplied to the division circuits 11, 13, 15, 17 and 18. There is thus carried out a so-called texture mapping processing in which desired figure data on a texture plane represented by the u- and v-coordinates are projected on a desired area on a display plane.

It can be appreciated that the present disclosure is for the purpose of illustration only and various features of the invention may be modified as so desired. For example, a multi-port memory may be used instead of the mult-port register file 1, and a memory may be used instead of the register file 2. Further, the division operation for linear interpolation may be carried out by a division circuit specially designed for this purpose. Moreover, the present invention may be applied for a so-called sectioning processing in which section views are displayed.

What is claimed is:

1. A polygon filling apparatus comprising:

linear interpolation means for linearly interpolating two selected sides of a polygon based upon component data supplied to said filling apparatus to provide linear interpolation data, said component data comprising different species of coordinates data and a species of intensity data, each species of said component data comprising initial value data and accumulated value data; and linear drawing means for generating linear drawing data based upon said linear interpolation data from said linear interpolation means;

said linear interpolation means including multi-port memory means for storing said initial value data and said accumulated value data of each species of said component data, memory means for storing incremental value data for each component data species corresponding to said value data stored by said multi-port memory means;

addition means for adding two addend data, a first register for temporarily and sequentially storing said initial value data and said accumulated value data and each species of said component data from said multi-port memory means, and simultaneously applying value data corresponding to one of said species stored therein to said addition means as one of said addend data and to said linear drawing means as said linear interpolation data, a second register for temporarily and sequentially storing said incremental value data from said memory means and applying incremental value data corresponding to said one species to said addition means as another of said addend data in synchronism with said first register, said addition means adding said incremental value data of said one species to said initial value data or accumulated value data of said one species to generate accumulated value data for said one species, a third register for temporarily and sequentially storing said accumulated value data from said addition means and simultaneously applying accumulated value data corresponding to another of said species to said multi-port memory means, and control means for simultaneously controlling (a) applying of said initial value data or said accumulated value data stored in said multi-port memory means to said first register, (b) applying of said incremental value data stored in said memory means to said second register, (c) applying of said initial value data or said accumulated value data stored in said first register to said addition means and said linear drawing means, (d) applying of said incremental value data stored in said second register to said addition means, (e) providing and applying of said accumulated value data by said addition means to said third register, and (f) applying of said accumulated value data stored in said third register to said multi-port memory means, whereby said linear interpolating means cyclically interpolates each species of component data and sequentially provides interpolated species data as said linear interpolation data.

2. A polygon filling apparatus as set forth in claim 1, wherein said memory means is formed of a register file or a memory.

3. A polygon filling apparatus as set forth in claim 1, wherein said first, second and third registers are pipe line registers.

4. A polygon filling apparatus as set forth in claim 1, wherein said multi-port memory is adapted to store value data associated with said different components of said linear interpolation data whereby said multi-port memory means and said memory means are adapted to apply first stored value data associated with one of said components to said first and second registers, said addition means is adapted to provide accumulated value data associated with another of said components to said third register, and said third register is adapted to apply accumulated value data associated with still another of said components to said multi-port memory means.

5. A polygon filling apparatus as set forth in claim 4, wherein said different components of said linear interpolation data include x-coordinate value data, y-coordinate value data, z-coordinate value data, and I-coordinate value data.

* * * * *